United States Patent Office 2,802,978
Patented Aug. 13, 1957

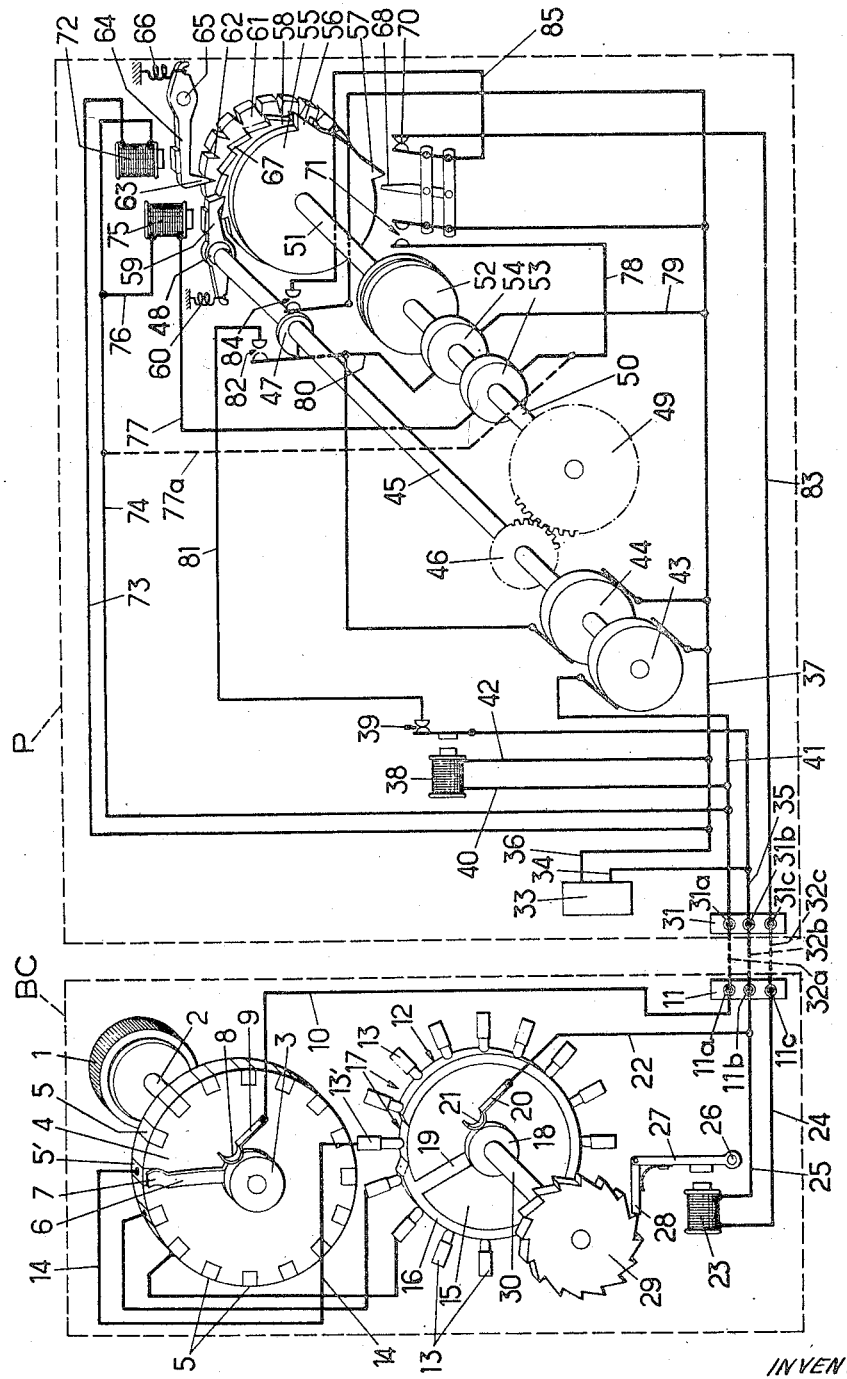

2,802,978

DISTANT CONTROL DEVICE FOR ROTATINGLY POSITIONING A SHAFT ON PRECISE PRESET POSITIONS

Robert Guy Legros, Sevres, France

Application November 23, 1954, Serial No. 470,719

Claims priority, application France November 20, 1953

11 Claims. (Cl. 318—467)

In many radioelectric installations, it is often necessary to separate the radio-set proper from the manual controls thereof, the radio-set and the operator being sometimes obliged to be located at a substantial distance from each other. The most delicate problem to be solved is the distant regulating of the position of a shaft utilised for driving devices such as variable condensers, attenuators and the like.

The present invention has for its object a very accurate, rapid and economical distant control device for controlling the driving of a shaft into rotation and for accurately positioning the same whenever said shaft must be successively rotated into well predetermined, for instance equally angularly spaced, positions.

According to the present invention, my improved device comprises a control box spaced from the radio-set proper at a distance which may be very great, only three conducting wires providing for the connection between said control box and said radio-set.

According to the invention, the control box comprises, firstly, a button or other rotary control member adapted to rotate about its axis and to be freely moved into definite positions regularly spaced over a circumference i. e. without having its circumferential path limited in either rotational direction by stopping means and, secondly, two contactors each comprising contactor studs equal in number to a number of preset positions, each contactor stud being electrically connected to one stud of the other contactor, respectively, the controlling circuit being open whenever the rotors of both contactors are occupying corresponding positions, while said circuit is closed whenever they are not occupying a corresponding position.

The shaft to be positioned is a part of the radio-set and said shaft is adapted to rotate about its axis over an angle less than 360°.

More specifically my improved device comprises, according to the invention, a step-by-step device which is adapted to simultaneously rotate a shaft located in the control box and said shaft which is a part of the radio-set, such step-by-step device being brought to a stop only when said control box shaft has reached a predetermined position defined by the position selected for the above mentioned button or other rotary control member. On the control box shaft is keyed the rotor of one of the contactors, while the other contactor is keyed on the shaft carrying said rotary control member.

Two suitably spaced stroke limiting means or stops are provided on a member secured to the radio-set shaft or integral therewith, thus limiting the possible free rotating displacement of said shaft to an angle less than 360°; therefore, at each step cleared by the step-by-step device said radio-set shaft pivots over an angle smaller than the angle rotated by the said control box shaft.

A means is provided for automatically stopping the steps-by-step device whenever the radio-set shaft comes against one of said stops, thereafter said automatic means causes said shaft to rapidly rotate in the opposite direction until said shaft comes against the other stop and then brings back to the step-by-step device ready to run again in the normal direction. To obtain such desired result, the radio-set may, according to the invention, comprise two motors mounted on the same shaft and driving the step-by-step device, one at a high speed and the other at a reduced speed. The high speed motor provides for a rough positioning and back driving of the radio-set shaft, while the reduced speed motor provides for the accurate positioning thereof.

In a preferred embodiment of the invention, a pawl cooperates with a ratchet or slotted wheel carried by the radio-set shaft to be positioned, the engagement of the nose of said pawl with one of the slot son said ratchet wheel providing for a very accurate positioning of said radio-set shaft.

For a more complete understanding of my invention, reference may be had to the accompanying diagrammatic drawing which, by way of illustration only, shows an exemplary distant control device embodying my said invention for supporting the description of same given hereinafter.

As shown in said drawing, the distant control device according to the invention is controlled by a hand driven control button 1 keyed on a control shaft 2 which carries the rotor 3 of a first contactor 4 having no stroke limiting means or stops but a number of studs 5 regularly spaced over the whole circumferential periphery of said contactor. The rotor 3 drives into rotation a resilient conducting strip 6 the end of which frictionally engages the studs 5. The rotor 3 is frictionally engaged by the end 8 of a resilient conducting strip 9 connected by a cable 10 to the first terminal 11a of an outlet junction box 11. A second contactor 12, having also no stops, is provided with studs 13 equal in number to the number of studs 5 carried by the contactor 4. The studs 13 are also equally spaced over the whole circumferential periphery of the contactor 12. Each stud 13 is respectively connected to its corresponding stud 5 by a wire member 14. The contactor 12 comprises an insulating portion 15 and a peripheral conducting portion 16 interrupted only in a portion 17 adjacent to a single stud, designated by 13', so that only such stud 13' is in direct contact with the insulating portion 15, while all other studs are in direct contact with the conducting portion 16. Said conducting portion 16 is electrically connected with the hub member 18, also made of a conducting material, of the contactor 12 by an electrically conducting radially extended or spoke member 19 connecting said conducting hub 18 to said conducting peripheral portion 16. One end 21 of a contact strip 20 frictionally engages the hub 18. Said contact strip 20 is connected to a second terminal member 11b of the outlet junction box by a cable 22. Between said second terminal 11b and a third terminal 11c of said outlet junction box 11 is mounted a magnetic coil 23 of a magnet supplied by wires 24 and 25 and adapted to swing a crank lever 27 about a pivot 26, one end 28 of said lever cooperating with the periphery of a ratchet wheel 29 keyed on a shaft 30 on which is keyed the contactor 12 so as to provide a step-by-step driving engagement of said wheel.

The above described unit forms the control box according to the invention and is shown in the left hand side of the drawing.

The outlet junction box 11 is connected by three cables 32a, 32b, and 32c to the inlet junction box 31 of the set P shown in the right hand side of the drawing. Said set P is supplied in direct current by a source 33 one terminal of which is connected to the second terminal 31b of the junction box 31 by the wires 34, 35. The other terminal of the source 33 is connected to a wire 37 by a wire 36. 38 is a relay coil of a relay having a contact device 39 adapted to be closed when no current passes through the coil 38 and to be open whenever said coil is energized. Said coil 38 is connected to a wire 41 by a wire 40 and to the wire 37 by a wire 42.

43 and 44 are two electric motors adapted to rotate in the same direction (or a single motor with two winding members) and mounted on a same shaft 45 which also carries a toothed wheel 46, a cam 47 and an eccentric member 48. The motor 43 is designed to rotate at a relatively high speed, while the motor 44 is designed to rotate at a relatively low speed. The toothed wheel 46 engages a toothed wheel 49 mounted on a shaft 50 which carries a clutch 52 for operatively coupling the shaft 50 to the shaft 51. 53 and 54 designate two control members for the clutch 52, such control members being independent one from the other. When either one of said control members is being energized, the shaft 51 is coupled with the shaft 50, the clutch 52 being however capable of slipping when a sufficiently strong torque is applied to the shaft 50, assuming the shaft 51 is held in a fixed position. Alternatively, when the control members 53 and 54 are not energized, the shaft 51 is not engaged with the shaft 50. On the shaft 51 are keyed a wheel 55 with projecting portions or stops 56, 57, a ratchet wheel 58 cooperating with a pawl 59 operated by the said eccentric member 48 against the biasing action of a spring 60, and a slotted wheel 61 provided with a number of slots 62 into which may operatively extend a tooth 63 of a pawl 64 pivotable about a pivot 65 and biased by a spring 66. The number of teeth of the ratchet wheel 58 and the number of slots of the slotted wheel 61 are respectively equal to the number of studs 5 or 13 and to the number of the teeth of the ratchet wheel 29. However, while the teeth of the ratchet wheel 29, as well as the studs 5 and 13 are equally spaced over the whole periphery of said ratchet wheel or said contactors 4 or 15, respectively, the teeth 67 of the ratchet wheel 58 and the slots 62 of the wheel 61 are equally spaced, respectively, over only a fraction of the circumferential periphery (e. g. ¾ of same) of the ratchet wheel 58 and of the wheel 61, respectively, on account of the fact that the movements of both wheels 58 and 61 are interrupted as either stop 56 or 57 engages a swinging lever 68 to swing it either to the right or to the left in order to close one swich 70 or 71, respectively, as further described hereinafter.

The pawl 64 is raised for disengagement by the action of coil 72 connected to wires 37 and 41 by wires 73 and 74, respectively. The pawl 59 is similarly released by the action of coil 75 connected to the wire 74 by wire 76 and, by wire 77, to one of the terminals of the control device 53. The other terminal of said control device 53 is connected to the wire 41 through wire 78 and switch 71. The other control device 54 is connected to the wire 37 by wire 79 and to the wire 35 through wires 80 and 81, contact device 39, and switch 82 controlled by the aforesaid cam 47. A wire 83 connects the third terminal 31c of inlet junction box 31 to the wire 37 through switch 70 and switch 84 controlled by the said cam 47. The switches 70 and 84 are interconnected by a wire 85.

The switches 70 and 71 which are controlled by the lever 68 are so arranged that the switch 70 is closed whenever the switch 71 is open and vice versa. The switch 84 is periodically closed upon rotation of the cam 47, while the switch 82 is periodically opened upon rotation of said cam 47, both switches being so relatively disposed that said switch 82 is not open when the switch 84 is closed.

At starting, the various elements of the device are relatively disposed as shown in the drawing; more particularly in the control box BC, both contactors afford a mating disposition relative to each other, that is to say that the stud 13', which is one of said studs 13, and then in contact with the insulating portion 15 of contactor 12, operatively corresponds to the stud 5', which is one of the studs 5, and then frictionally engaged by the end 7 of strip 6. The circuit including the cables 10 and 22 is, therefore, interrupted, and the whole control box is at rest.

In the radio-set P, the switch 71 is open and the switch 70 closed. The cam 47 occupies such a position that both switches 82 and 84 are open. Under such conditions, no current can be supplied by the source 33 and the whole set P is also at rest.

The operation of my distant control device beginning at this starting position will now be described first in general terms, and then in detail.

The succession of main operational and circuit events, apart from the circuitry involved, which characterizes that positioning cycle which does not include actuation of the reversing limit switch having contacts 70 and 71 (which succession of events is hereinafter referred to as "Cycle A"), are the following, assuming that the selector switch arm 6 has been moved clockwise one notch to contact 4:

1. A circuit energizing fast motor 43 is completed.
2. This operates through eccentric 48 and pawl 59 to ratchet the controlled shaft 51 clockwise until
3. Ratcheting relay 23, which is intermittently energized through a circuit including limit switch contacts 70 and cam closed contacts 84, operates to rotate shaft 30, and the seeking switch contact disc 12 it carries, to an angular point where the circuit of fast motor 43 is opened. The relay 38 is deenergized at the same time and, as a result,
4. The slow, or fine adjustment motor 44 is energized, together with clutch 52 (through a circuit including contacts 84 and contacts 39). As a result, shaft 51 is slowly driven counterclockwise for a brief interval until cam 47 has rotated sufficiently to open contacts 84.
5. In the meantime, the detent 64 (which has been resting on the surface of a tooth of ratchet wheel 62 as a result of deenergization of relay coil 72 to open circuit position), drops into the inter-tooth recess which has been intentionally overrun.

In case contact arm 6 is moved to certain selector positions, the remote shaft positioning cycle requires the actuation of reversing limit switch having contacts 70 and 71, reverse or counterclockwise drive by the fast motor 53 for an interval, and then forward or clockwise drive to the selected position as in the case of Cycle A.

Assuming that the reversing limit switch has just been shifted to its left position as a result of engagement of stop 57 and lever 68, the following main system events occur:

1. Ratcheting relay 23 is deenergized by opening of the contacts 70.
2. Fast motor 43 remains energized because contactor 12 of the seeking switch has not yet been turned to a circuit breaking position.
3. Clutch 53 is energized at contacts 71 and, by the same circuit, relay 75 is energized to lift pawl 59. (Drive of the shaft 51 must now be through one of the clutches 52 or 53.)
4. Shaft 51 is then driven counterclockwise by fast motor 43 through gearing 46, 49 and clutch 53 to the other limit position, where stop 56 engages lever 68, moving the limit switch to the right-hand position, in which contacts 71 are closed and contacts 70 are open.
5. Fast motor 43 now drives the shaft 51 clockwise through eccentric 48 and pawl 59, as in cycle A, while ratcheting relay 23, which is periodically energized by successive closings of cam actuated contacts 84, drives seeking switch contactor 12 to its open circuit position corresponding to that of selector arm 7. That is to say, operation of the system following the second actuation of the reversing limit switch lever 68, is that described above as "Cycle A Operation."

The same sequences of operations will now be described in detail: One first turns the control button 1 in order to bring it into a position different from its starting position as defined above, by bringing the end 7 of the strip 6 on a stud 5 which is not the starting stud 5'. The circuit comprising the cables 10 and 22 is then completed, because the stud 13 corresponding to the stud 5 frictionally engaged by the end 7 is now bearing on the conducting portion 16 of contactor 12. As a result, the conductors or wires 36 and 41 connected to the source 33 in set P are under tension and, accordingly;

The magnet coil 72 is being energized and attracts the pawl 64 which, in its turn, releases the wheel 61 and, therefore, the shaft 51 with it;

The magnet coil 38 is being energized, thus opening the switch 39;

The high speed motor is being energized, thus driving the shaft 45 into rotation, as well as the shaft 50, the latter by means of wheels 46, 49.

The rotation of the shaft 45 has the following result:

(a) To periodically close the switch 82, which is connected to the switch 39 now open, and, therefore, with no resulting flow of current at this stage of operation;

(b) To periodically operate the pawl 59 and to cause the same to drive the ratchet wheel 58 step-by-step in a clockwise direction, as viewed in the drawing;

(c) To periodically close the switch 84, thereby periodically energizing the magnet coil 23 in the control box, said magnet coil operating the crank lever 27 the end 28 of which drives the ratchet wheel 29 into rotation step-by-step in a clockwise direction, as viewed in the drawing, the contactor 12 being simultaneously driven into rotation step-by-step.

It may thus be seen that the step-by-step advance of the contactor 12 operates in perfect synchronism with the simultaneous advance given to the wheel 58. Such synchronized simultaneous step-by-step advance of the elements 12 and 58 continues until the first of the two following events occurs:

1. The contactor 12 arrives in a position mating with the position assumed by the contactor 4, that is to say that the one stud 13 corresponding to the one stud 5 engaged by the end 7 of the strip 6 is no more in contact with the conducting portion 16 but with the insulating portion 15;

2. The stop 57 comes in engagement with the swinging lever 68.

Both above states of conditions will be successively considered hereinafter.

1. In the first case, the contactor 12 arrives in correspondence with the contactor 4 before the stop 57 engages the lever 68. Therefore, the circuit between the terminals 11a and 11b in the outlet junction box 11 is being interrupted before the ratchet wheel 58 has reached the end of its stroke and it has been further assumed that the stop 57 has not reached the lever 68 yet. At the moment the circuit between the terminals 11a and 11b is being interrupted the cam 47 occupies such a position that the switch 82 is closed; the wire 35 is no more connected to the wire 41; consequently, the source 33 applies no tension between the wires 36 and 41, and, therefore:

No current is supplied to the motor 43;

No current is supplied to the magnet coil 72, thus causing the pawl 64 to fall again on the slotted wheel 61, the latter wheel having been so designed and mounted with respect to the ratchet wheel 58 that it is constrained to lay in a such position that the sharp end 63 of pawl 64 remains between two consecutive slots 62 when the pawl 48 is in its farthest right position with a tooth of said ratchet wheel abutting its right end.

No current is supplied to the magnet coil 38, which results in the closing of switch 39.

Both switches 39 and 82 being closed, the low speed motor 44 starts running and the device 54 controlling the clutch 52 operates the latter clutch, thus coupling the shafts 50 and 51 together.

The eccentric member 48 is so mounted that upon rotation of the shaft 45 at this moment the latter operates the pawl 59 in such manner that said pawl is driven back away from the ratchet wheel 58 and, accordingly, is without action on said ratchet wheel or simply limits the reverse motion of same.

Consequently:

The ratchet wheel 58 is driven into rotation in a counterclockwise direction by the shaft 51 until the sharp end 63 of pawl 64 falls into the immediately adjacent slot 62, and, from now on, the ratchet wheel 61, and, therefore, the shaft 51 are locked in their positions, thus causing the clutch 52 to slip;

The cam 47 is driven into rotation and causes the opening of the switch 82 after the locking of the shaft 51, the various cooperating elements being suitably designed and arranged to obtain such opening.

The state of conditions is now the same as existed at starting and as shown in the drawing, with the exception that the wheels 55, 58 and 61 have faithfully reproduced the rotating motion imparted to the control button 1 in the control box BC, such a result giving a proof that, at least in that first considered case, my improved distant control device has perfectly fulfilled its purposes;

2. Considering now the second case and assuming, therefore, that both contactors 4 and 12 have not yet reached their corresponding positions when the stop 57 on wheel 55 has already reached its position of engagement with the lever 68. Such engagement of the lever 68 swings the latter lever, thereby opening the switch 70 and closing the switch 71. The opening of switch 70 interrupts the circuit of the magnet coil 23, thus stopping the rotating motion of contactor 12. The closing of switch 71 results in the following;

The control member of the clutch 52 is being energized, thereby coupling the shaft 51 to the shaft 50;

The magnet coil 75 is being energized thereby releasing the pawl 59 from the ratchet wheel 58.

Consequently, the ratchet wheel 58 is driven by the high speed motor 43 in a counterclockwise direction until the second stop 56 engages the lever 68 and brings it back to its initial position, as shown in the drawing, thereby opening the switch 71 and closing the switch 70.

The control member 53 is no more energized and, therefore, the shafts 50 and 51 are no more in clutching engagement. The magnet coil 75 is no more energized and said coil releases the pawl 59 which is now ready to drive again the ratchet wheel 58 step-by-step in a clockwise direction.

As the switch 70 is now closed, the magnet coil 23 is energized again and operates the crank lever 27, so that the end 28 thereof drives the ratchet wheel 29 forward step-by-step in a clockwise direction, and also the contactor 12 associated to said wheel. The state of conditions is now the same as described with reference to the above first case and the step-by-step rotation of the ratchet wheels 58 and 29 will continue until both contactors 4 and 12 reach simultaneously their position of correspondence, an event which is obliged to occur before the stop 57 comes into engagement with the lever 68.

Since the ratchet wheel 58 has a number of teeth equal to the number of studs of the contactor 12, i. e. to the number of different positions which the control button 1 may occupy, at each position of button 1 corresponds, for the third shaft 51 to be positioned, the same position of balance, which position is predetermined in a very accurate manner owing to the precise engagement of the sharp end of pawl 64 into one slot 62.

It appears, from the above description of one embodiment of my invention, that I have provided a distance control device which enables to angularly position a shaft such as the third shaft 51 with a very great accuracy from the angular position given to another shaft such as the first shaft 2, manually controlled as by a button 1, under the conditions in accordance with the invention.

Obviously, while I have shown and described a particular embodiment of my invention, it will be understood that I do not wish to be limited thereto since many modifications may be made and I therefore contemplate by the appended claims to cover any such modifications as fall within the true spirit and scope of my said invention.

I claim as my invention:

1. A distance control device for rotatingly positioning a third shaft on precise preset circumferential positions, including an electro-mechanical control assembly comprising a first shaft freely rotatable over more than 360°, a rotary control member rigidly mounted on said first shaft and adapted to be rotated into a number of predetermined positions equally spaced over a circumferential path, a first contactor rotor rigidly mounted on said first shaft, a second contactor rotor rigidly mounted on a second shaft, a ratchet wheel rigidly mounted on said second shaft, an operating member for driving said ratchet wheel, said first contactor rotor carrying conducting studs equally spaced over the whole circumferential periphery of same, said second contactor rotor carrying conducting studs equally spaced over the whole circumferential periphery of same, means electrically connecting each stud of one rotor to each stud of the other rotor, respectively, means for step-by-step driving said second shaft, and an electro-mechanical auxiliary assembly adapted to be mechanically associated with said third shaft to be distance positioned, said auxiliary assembly comprising a fourth shaft, a stop wheel having two spaced peripheral stops thereon, a second ratchet wheel, a slotted wheel, said last three wheels being coaxially rigidly mountable on said third shaft and a pawl member cooperating with said slotted wheel, a clutch for operatively coupling said third and fourth shafts, two control members for controlling said clutch, a fifth shaft, a switch controlling cam rigidly mounted on said fifth shaft, an eccentric member rigidly mounted on said fifth shaft, a pawl member cooperating with the teeth of said second ratchet wheel and in operating relationship with said eccentric member, a high speed driving means, a low speed driving means both for driving said fifth and said fourth shaft, means for simultaneously and correspondingly driving said third shaft therewith, and means for stopping the said step-by-step motion when the third shaft reaches a rest position defined by said stops, said high speed driving means providing for a rough positioning and the reverse driving of said third shaft, while the low speed driving means provides for the precise positioning of said third shaft.

2. A distance control device according to claim 1, wherein said precise positioning means comprises an eccentric member, adapted to allow the reverse rotating motion of said second ratchet wheel over a distance shorter than the peripheral extension of one tooth of said ratchet wheel, and a pawl member having a sharp angled end adapted to lockingly engage the bottom of a slot of said slotted wheel in the course of said reverse rotation motion.

3. A device for remotely controlling the angular position of a driven shaft among a plurality of predetermined settings which comprises a manually operable rotary control member adapted to be turned from a zero position to any one of a plurality of angular positions each of which corresponds to one of said predetermined settings for said driven shaft, power means including at least one motor for driving said driven shaft, a first circuit connecting up said power means to drive said driven shaft in one direction, a second circuit connecting up said power means to drive said driven shaft in the opposite direction, switch means responsive to a change in the position of said control member for closing said first circuit and thereby energizing said power means to drive said driven shaft in said first direction until it reaches a preliminary position slightly beyond the one corresponding to that of the control member, and then automatically breaking said first circuit when said driven member arrives at said preliminary position and closing said second circuit, thereby connecting up said power means to drive said driven shaft slowly in the opposite direction until it reaches the predetermined setting corresponding to that of said control member, and means for arresting the movement of said shaft when it arrives at said predetermined setting.

4. A device as claimed in claim 3 in which said control member may rotate more than 360° in a single direction, but the rotation of said driven shaft is limited to less than 360° which comprises means for automatically returning said driven shaft to a zero setting when said control member is turned more than 360° from its zero position and then reinitiating the rotation of said driven shaft.

5. A device as claimed in claim 3 in which said control member forms part of a control section and said driven shaft forms part of a separate terminal section and the two sections are connected by only three electrical conductors through which the position of said driven shaft is regulated by movement of said control member.

6. A device as claimed in claim 3 in which said power means, a first toothed wheel, and an eccentric are fixed on a common actuating shaft, said first toothed wheel drives a second toothed wheel which is mounted on an intermediate shaft, said intermediate shaft carries clutch means through which it drives said driven shaft, a ratchet wheel is fixed to said driven shaft and said eccentric actuates a driving pawl which turns said ratchet wheel, closing of said first circuit connecting up said power means to drive said driven shaft through said eccentric, pawl and ratchet wheel, said clutch not being engaged until said driven shaft arrives at said preliminary position at which time said first circuit is opened and said second circuit closed, thereby drawing said pawl out of engagement with said ratchet wheel and engaging said clutch so that said driven shaft is driven slowly through said toothed wheel and clutch.

7. A device as claimed in claim 6 in which said actuating shaft carries a cam so positioned thereon as to open a secondary switch in said second circuit less than one revolution of said actuating shaft after said second circuit has been closed.

8. A device as claimed in claim 7 in which said means for arresting the movement of the driven shaft comprises a notched wheel on said shaft, a pivotally mounted stopping pawl positioned to normally engage a notch in said wheel and solenoid means in said first circuit which retains said pawl in a position away from said wheel when said solenoid is energized by closing of said first circuit, but releases it when said first circuit is opened and said second circuit is closed.

9. A device as claimed in claim 8 in which the number of slots in said slotted wheel and the number of teeth on said ratchet wheel are each equal to the number of predetermined settings for the driven shaft and to the number of corresponding positions for the control member, the positions of said control member being equally spaced through 360°, whereas the slots in the slotted wheel and teeth on the ratchet wheel are equally spaced about an arc less than 360°, and when said ratchet and slotted wheels are turned past the end of said arc a protuberance fixed to said ratchet wheel closes a switch which completes a third circuit thereby engaging said clutch and drawing said driving pawl out of engagement with said ratchet wheel so that said power means drives back to zero position.

10. A device as claimed in claim 3 in which said rotary control member comprises a first contactor having contactor studs equal in number to the number of said preset circumferential positions and equally spaced over the periphery of said first contactor, and a second contactor having contactor studs equal in number to the number of said preset circumferential positions and equally spaced over the periphery of said second contactor, each contactor stud in one contactor being electrically connected to one stud of the other contactor, respectively, said first circuit being open whenever the rotors of both contactors are occupying corresponding positions and closed whenever the rotors of both contactors are not occupying corresponding positions.

11. A distance control device according to claim 10, wherein the rotor of said second contactor is carried by a second shaft, a first ratchet wheel being carried by said second shaft, the teeth of said first ratchet wheel being equally spaced over the whole periphery of said wheel, and a magnet means providing a step-by-step advance of said ratchet wheel.

References Cited in the file of this patent
UNITED STATES PATENTS

| | | |
|---|---|---|
| 1,583,439 | Barr et al. | May 4, 1926 |
| 1,883,163 | Voorhis | Oct. 18, 1932 |